United States Patent

(12) United States Patent
Harris et al.

(10) Patent No.: US 8,734,714 B2
(45) Date of Patent: May 27, 2014

(54) MAGNET RECYCLING

(75) Inventors: Ivor Rex Harris, Birmingham (GB);
Andrew Williams, Birmingham (GB);
Allan Walton, Dudley (GB); John Speight, Framlingham (GB)

(73) Assignee: The University of Birmingham, Birmingham (GB)

( * ) Notice: Subject to any disclaimer, the term of this patent is extended or adjusted under 35 U.S.C. 154(b) by 206 days.

(21) Appl. No.: 13/169,839

(22) Filed: Jun. 27, 2011

(65) Prior Publication Data

US 2012/0137829 A1    Jun. 7, 2012

(30) Foreign Application Priority Data

Dec. 2, 2010 (GB) .................................. 1020383.4

(51) Int. Cl.
*C21D 1/74* (2006.01)
*C22B 59/00* (2006.01)
*B22F 9/16* (2006.01)
*H01F 1/06* (2006.01)
*H01F 1/055* (2006.01)
*C22B 7/00* (2006.01)
*B22F 9/02* (2006.01)
*B22F 9/00* (2006.01)

(52) U.S. Cl.
CPC ............... *H01F 1/0553* (2013.01); *C21D 1/74* (2013.01); *C22B 7/002* (2013.01); *C22B 59/00* (2013.01); *B22F 9/023* (2013.01); *B22F 2009/001* (2013.01)
USPC ............. 266/137; 266/251; 148/105; 75/348; 75/354

(58) Field of Classification Search
None
See application file for complete search history.

(56) References Cited

U.S. PATENT DOCUMENTS 4,820,481 A * 4/1989 Wolff et al. ....................... 419/3
4,893,756 A    1/1990 Fetcenko et al.
(Continued)

FOREIGN PATENT DOCUMENTS

DE    19843883 C1    7/1999
GB    1020383.4    12/2010
(Continued)

OTHER PUBLICATIONS

Ahmad, A., "The Effect of Alloy Additions on the Magnetic Properties of RFeB Sintered Magnets", Pakistan Engineering Conference, 69th Annual Session Proceedings, 2004, pp. 365-370.*

(Continued)

*Primary Examiner* — George Wyszomierski
(74) *Attorney, Agent, or Firm* — Wells St. John P.S.

(57) ABSTRACT

The present invention discloses a method for recovering rare earth particulate material from an assembly comprising a rare earth magnet and comprises the steps of exposing the assembly to hydrogen gas to effect hydrogen decrepitation of the rare earth magnet to produce a rare earth particulate material, and separating the rare earth particulate material from the rest of the assembly.
The invention also resides in an apparatus for separating rare earth particulate material from an assembly comprising a rare earth magnet. The apparatus comprises a reaction vessel having an opening which can be closed to form a gas-tight seal, a separation means for separating the rare earth particulate material from the assembly, and a collection means for collecting the rare earth particulate material. The reaction vessel is connected to a vacuum pump and a gas control system, and the gas control system controls the supply of hydrogen gas to the reaction vessel.

25 Claims, 3 Drawing Sheets

(56) References Cited

U.S. PATENT DOCUMENTS

| | | | |
|---|---|---|---|
| 5,678,773 A * | 10/1997 | Takamura et al. | 241/23 |
| 6,444,052 B1 | 9/2002 | Honkura et al. | |
| 6,533,837 B1 * | 3/2003 | Yamagata et al. | 75/348 |
| 2006/0162821 A1 | 7/2006 | Reppel | |
| 2013/0263699 A1 * | 10/2013 | Harris et al. | 75/363 |

FOREIGN PATENT DOCUMENTS

| | | |
|---|---|---|
| GB | 1020383.4 | 4/2011 |
| GB | 1020383.4 | 6/2011 |
| JP | 63121606 | 5/1988 |
| JP | 63264868 | 11/1988 |
| JP | 2263902 | 10/1990 |
| JP | 10219311 | 8/1998 |
| JP | 2000030919 | 1/2000 |
| JP | 2004339542 | 12/2004 |
| WO | PCT/GB2011/001680 | 3/2012 |
| WO | WO 2012/072989 | 6/2012 |

OTHER PUBLICATIONS

Zakotnik et al.; "Possible methods of recycling NdFeB-type sintered magnets using the HD/degassing process" Journal of Alloys and Compounds, vol. 450 (2008); pp. 525-531.

Zakotnik etal.; "Multiple recycling of NdFeB-type sintered magnets"; Journal of Alloys and Compounds, vol. 469, Feb. 5, 2009; pp. 314-321.

Zakotnik et al. "Hydrogen Decrepitation and Recycling of Sintered NdFeB-type Sintered Magnets", Proceedings of 19th International Workshop on Rare Earth Permanent Magnets & Their Applications (2006), pp. 289-295.

* cited by examiner

US 8,734,714 B2

MAGNET RECYCLING

CROSS REFERENCE TO RELATED APPLICATION

This application claims priority to UK Patent Application No. 1020383.4, which was filed on 2 Dec. 2010 (02.12.2010), the teachings of which are incorporated herein by reference.

The present invention relates to a process and apparatus for recycling magnets. In particular, the invention relates to a process and apparatus for recovering rare earth magnets from assemblies.

Rare earth magnets, in particular permanent magnets of the NdFeB type (neodymium iron boron magnets) and SmCo (samarium cobalt), are known for their high magnetic flux combined with high coercivity compared with conventional magnets. Such magnets have found application in a wide range of electronic goods and "green" technologies such as wind turbine generators and electric motors in electric and hybrid vehicles.

The supply of materials for rare earth magnets, particularly the supply of neodymium (Nd) and dysprosium (Dy), is limited and demand is expected to exceed supply. This will cause material prices to increase and limit the use of NdFeB magnets and the development of green technologies unless alternative magnets or sources of supply can be found. Dy is used as an additive to NdFeB for high coercivity magnets used in motor applications. The limited supply of Nd, samarium (Sm) and Dy is a major concern to many developed economies and some countries are now classifying these as strategic materials.

NdFeB magnets are the most common of the rare earth magnets and are manufactured in two forms; fully dense magnets produced by a sintering process and bonded magnets, a cheaper form with a lower performance where magnetic particles of NdFeB are bonded into a structure with resins.

Currently, approximately 50% of sintered NdFeB magnets are supplied for use in computer hard drives as small thin magnets, each of which is approximately 20 grams. It is desirable to recover and recycle the NdFeB magnets at the end of the life of the hard drives. However, the only current method of recovery is by disassembly and mechanical removal of the magnet, which is a time-consuming and labour-intensive process. This labour-intensive mechanical recovery of NdFeB magnets is relatively expensive, particularly in western countries where there is a need to retain stocks of such magnets to reduce exposure to raw material supply constraints.

Recovery of bonded magnets by dissolution processes is known from U.S. Pat. No. 6,533,837, however, such processes cannot be used for sintered NdFeB magnets.

Hydrogen Decrepitation (HD) is a known process for breaking rare earth alloys such as NdFeB into powder, as described by Zakotnik et al. ("Hydrogen Decrepitation and Recycling of Sintered NdFeB-type Sintered Magnets", Proceedings of 19$^{th}$ International Workshop on Rare Earth Permanent Magnets & Their Applications; pp 289-295). In the decrepitation process hydrogen preferentially enters the rare earth rich grain boundaries in the material. The hydrogen reacts with the rare earth elements to form a hydride compound with the $H_2$ trapped in the crystal structure. The volume expansion of the crystal structure due to formation of the hydride causes the brittle structure to fracture so that grains break away from the material forming a fine powder.

There is thus a need for a cost-effective and efficient method of recovering rare earth particulate material from assemblies.

According to a first aspect of the present invention there is provided a method for recovering rare earth particulate material from an assembly comprising a rare earth magnet, the method comprising the steps of:

exposing the assembly to hydrogen gas to effect hydrogen decrepitation of the rare earth magnet whereby a rare earth particulate material is produced, and separating the rare earth particulate material from the rest of the assembly.

The term "assembly" will be understood to mean any mechanical, electric or electronic device, machine or apparatus comprising multiple components, including, but not limited to, computer hard drives, speakers, dynamos, tools, motors, generators and the like.

It is known that rare earth magnets can be recycled using the process of hydrogen decrepitation (HD), but the process has previously only been applied to magnets and not to assemblies where the main proportion of the content is other materials, which makes the magnets difficult to access. Thus the method of the invention allows rare earth particulate material to be recovered from an assembly without the need to first disassemble the components of the assembly, thereby saving time, labour and money. Conveniently, multiple assemblies may be processed at the same time to extract the rare earth particulate material.

In an embodiment, the rare earth magnet is NdFeB or SmCo.

In an embodiment, the magnet is demagnetised during the decrepitation process, thereby allowing the rare earth particulate material to be easily separated from the other components of the assembly. In an alternative embodiment, the rare earth magnet is not demagnetised by the decrepitation process. The magnet may be demagnetised by other methods, for example by heating or by reversing the magnetic field. For some rare earth magnets which generate weaker magnetic fields, demagnetisation is not required in order to separate the rare earth particulate material from the rest of the assembly.

In an embodiment, the method comprises an initial step of opening the assembly prior to exposing the assembly to the hydrogen gas, in order to facilitate exposure of the rare earth magnet to the hydrogen. Opening of the assembly may involve destructively processing the assembly. For example, the assembly may be destructively processed by a mechanical process such as shredding or crushing. Shredding may be particularly important for assemblies which are relatively gas tight, such as computer hard drives. Alternatively, the assembly may be left complete and intact prior to its exposure to the hydrogen gas.

The assembly may be exposed to pure hydrogen gas, or it may be exposed to a mixture of hydrogen with one or more inert gases, for example nitrogen or argon. In an embodiment, the assembly is exposed to an atmosphere comprising no more than 10% hydrogen, no more than 5% hydrogen or no more than 3% hydrogen. The use of a non-explosive gas mixture simplifies the processing equipment and makes handling of the gas safer.

The pressure (or partial pressure where a mixture of gases is used) of hydrogen must be sufficient to break up the magnet structure and turn it into a particulate material. If the pressure (or partial pressure) of hydrogen is too low the reaction kinetics will be too slow for the process to be commercially viable. If the pressure is too high the reaction vessel will have to be engineered to withstand the higher mechanical stresses, which will increase the complexity and cost and result in smaller reaction chambers. In a series of embodiments the pressure, or partial pressure where a mixture of gases is used, of hydrogen is from 1 mbar to 100 bar, from 0.1 bar to 50 bar, from 0.5 bar to 20 bar, or from 1 bar to 10 bar.

The atmosphere may be static or it may be flowing. If a static atmosphere is used, the level of hydrogen gas may need to be topped-up to maintain the pressure required and replace the gas which is consumed by the decrepitation process.

In an embodiment, the decrepitation process (i.e. the exposure of the assembly to the hydrogen gas) is carried out at a temperature of no more than 600° C., no more than 400° C., no more than 200° C. or no more than 170° C. In an embodiment, decrepitation is carried out at a temperature of no less than 5° C., no less than 10° C., no less than 15° C. or no less than 20° C. If the temperature is too high, formation of the hydride will not occur so the magnet(s) will not turn into a particulate material. It is also possible that at high temperatures other parts of the assembly could melt and hinder the recovery of the particulate magnet material.

The assembly is exposed to the hydrogen gas for a period of time which depends on the hydrogen gas pressure and the temperature of the decrepitation process. In an embodiment, the assembly is exposed to the hydrogen gas for a period of time of from 1 hour to 64 hours, from 2 to 52 hours or from 3 to 48 hours. In an embodiment in which an atmosphere of pure hydrogen is used, the assembly is exposed to hydrogen for a period of time of from 2 to 8 hours, from 3 to 6 hours or from 4 to 5 hours. If a non-explosive mixture of gas is used, the decrepitation process may take up to 48 hours.

The rare earth particulate material resulting from the decrepitation process (also referred to as the 'particulate material' or 'particles') is separated from the remaining assembly components. Separation of the rare earth particulate material may be carried out by any suitable method, including mechanical means such as shaking, vibration, sieving or tumbling, or using centrifugal forces. Separation of the particulate material may be carried out during and/or after the decrepitation process.

The rare earth particulate material which results from the decrepitation process comprises a hydride of the rare earth element. In an embodiment, the method of the invention comprises an additional step of degassing to break down the hydride to remove the $H_2$ from the particulate material. In an embodiment, degassing is carried out by heating the particulate material. In a series of embodiments, degassing is carried out at a temperature of no more than 1500° C., no more than 1000° C. or no more than 800° C. In another series of embodiments, degassing is carried out at a temperature of no less than 400° C., no less than 500° C., no less than 600° C. or no less than 700° C. In a particular embodiment, degassing is carried out at a temperature of 750° C. In another series of embodiments, degassing is carried out at a pressure of no more than 1 Bar, no more than 0.5 Bar, no more than 0.1 Bar, no more than 0.05 Bar or no more than 0.01 Bar. Degassing may be carried out immediately after formation of the particulate material by the decrepitation process, or it may be carried out at a later time or date.

The rare earth particulate material may have a particle size ranging from about 1 μm to about 0.5 cm in size. The minimum particle size is determined by the grain size of the alloy. Optionally, the particulate material may be sieved to separate particles of different sizes. Sieving can be particularly useful for removing plating, such as nickel or zinc electroplate, which is commonly found on magnets to protect them from corrosion.

According to a second aspect of the present invention there is provided apparatus for separating rare earth particulate material from an assembly comprising a rare earth magnet, the apparatus comprising a reaction vessel having an opening which can be closed to form a gas-tight seal, a separation means for separating the rare earth particulate material from the assembly, and a collection means for collecting the rare earth particulate material, wherein the reaction vessel is connected to a vacuum pump and a gas control system, and wherein the gas control system controls the supply of hydrogen gas to the reaction vessel.

In an embodiment, the apparatus further comprises a means for opening or destructively processing the assemblies prior to decrepitation. In a particular embodiment, the apparatus comprises a shredder for shredding assemblies prior to the assemblies being loaded into the reaction vessel.

The scrap assemblies may be manually loaded into the reaction vessel, or they may be loaded from a hopper. In an embodiment, the assemblies are transported from the destructive processing means to the reaction vessel by a conveyor.

In a further embodiment, the apparatus comprises a heater for heating the reaction vessel during the decrepitation and/or degassing process. In another embodiment, a temperature control system is provided to monitor and control the temperature inside the sealed reaction vessel when the apparatus is in use, i.e. during the decrepitation process. The temperature may be manually controlled, or it may be controlled by a preset programme.

The gas control system may monitor and control the pressure inside the sealed reaction vessel when it is in use. The pressure may be manually controlled, or it may be controlled by a preset programme.

In an embodiment, the separation means comprises a porous container which is positioned inside the reaction vessel. The rare earth particulate material produced by the decrepitation process may pass through the pores of the bottom and sides of the container and into the reaction vessel, while the remaining assembly components are retained within the container, thereby separating the particulate material from the assembly. The porous container may be removable, or it may be permanently fixed within the reaction vessel. In a particular embodiment, the separation means further comprises a vibration means which agitates the porous container to facilitate separation of the loose particles from the assembly.

The collection means may be constituted by the reaction vessel or a part thereof. For example, the base of the reaction vessel may constitute the collection means. Alternatively, the collection means may comprise a separate collection vessel that is connected to the reaction vessel. The collection vessel may be isolated from the reaction vessel by a valve which can be opened to allow the particles to pass from the reaction vessel into the collection vessel when required. In an embodiment, the collection vessel is situated underneath the reaction vessel so that the particles fall under gravity into the collection vessel when the valve is opened.

The invention will now be described by way of example with reference to the accompanying figures in which:

FIG. 1 shows apparatus according to an embodiment of the present invention, which is used to recover rare earth magnets from assemblies using hydrogen decrepitation.

Figure 1:
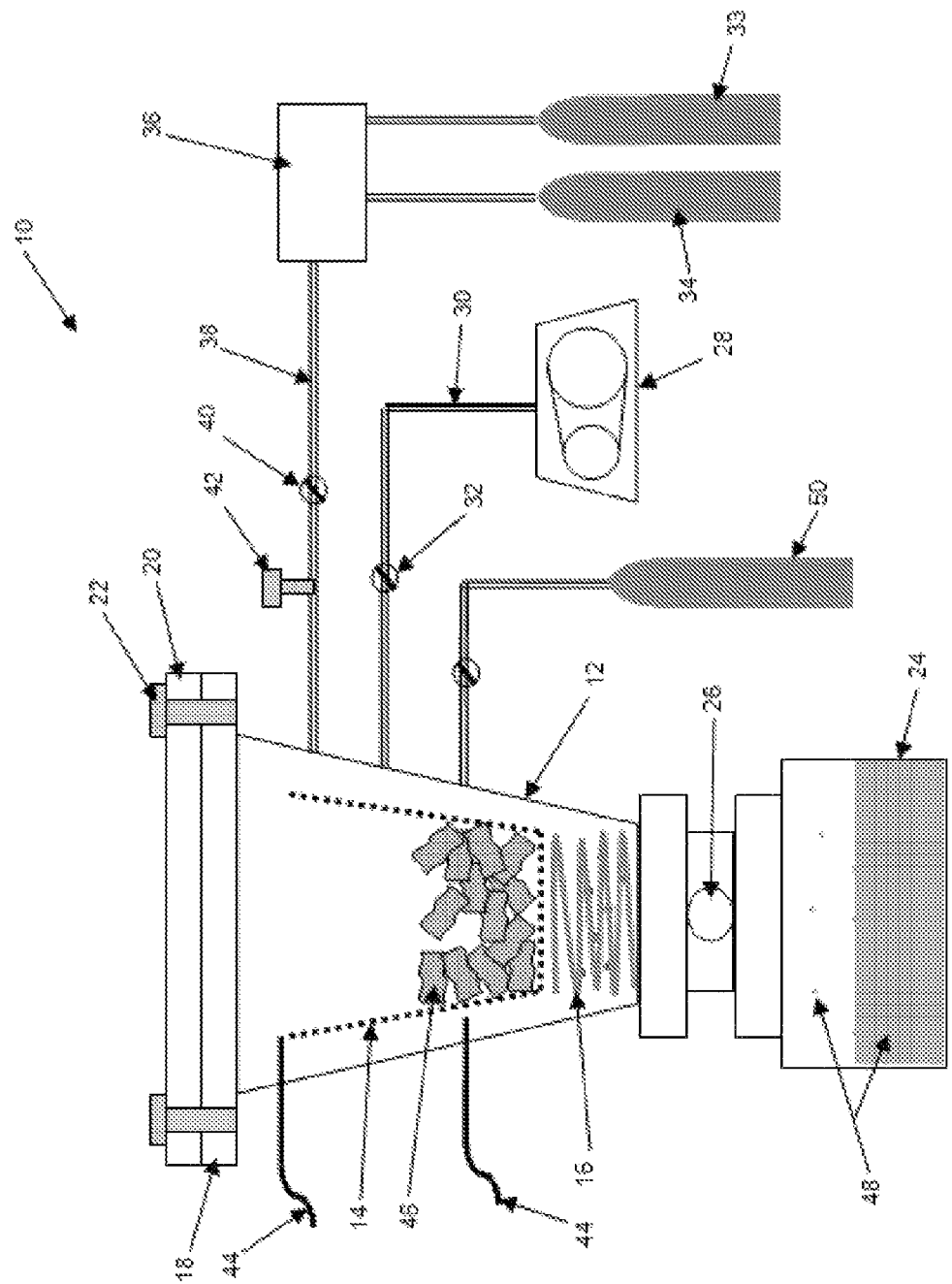
FIG. 1 is a schematic diagram of apparatus according to an embodiment of the present invention.

The apparatus 10 comprises a reaction vessel 12 which houses a porous container 14 positioned above a heater 16. The reaction vessel 12 is open at its top end 18 so that scrap assemblies can be loaded into the vessel 12. The reaction vessel 12 can be closed by a lid 20 which is fastened by a securing means 22, to give a gas tight seal between the vessel top 18 and the lid 20.

The reaction vessel 12 is situated above a collection vessel 24 which is used to collect the rare earth particulate material produced by the decrepitation process. A valve 26 is used to control the flow of particulate material from the reaction vessel 12 to the collection vessel 24.

The reaction vessel 12 is connected to a rotary vacuum pump 28 via tubing 30. The flow of gas through the tubing 30 is controlled by a valve 32.

The reaction vessel 12 is also connected to gas supply sources 33, 34 through a gas control system 36 via a gas line 38. The gas control system 36 monitors the pressure in the reaction vessel 12 and maintains it at the desired level. A gas line valve 40 and a pressure transducer 42 are situated on the gas line 38 to allow monitoring and control of the gas flow to the reaction vessel 12.

Thermocouples 44 are provided to monitor the temperature inside the reaction vessel 12.

Figure 2B:
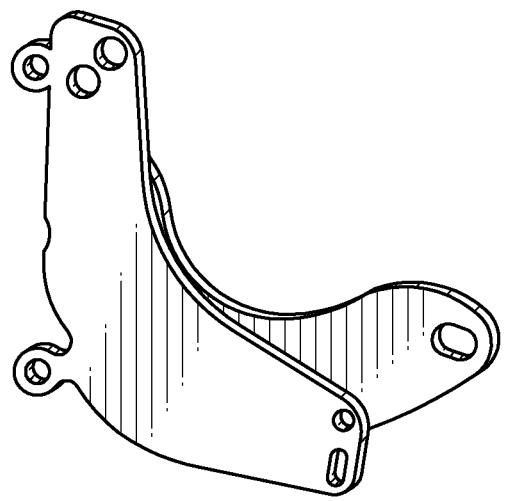
FIG. 2b shows a voice coil assembly manually removed from a computer hard drive, prior to being processed by the method of the present invention.
Figure 2A:
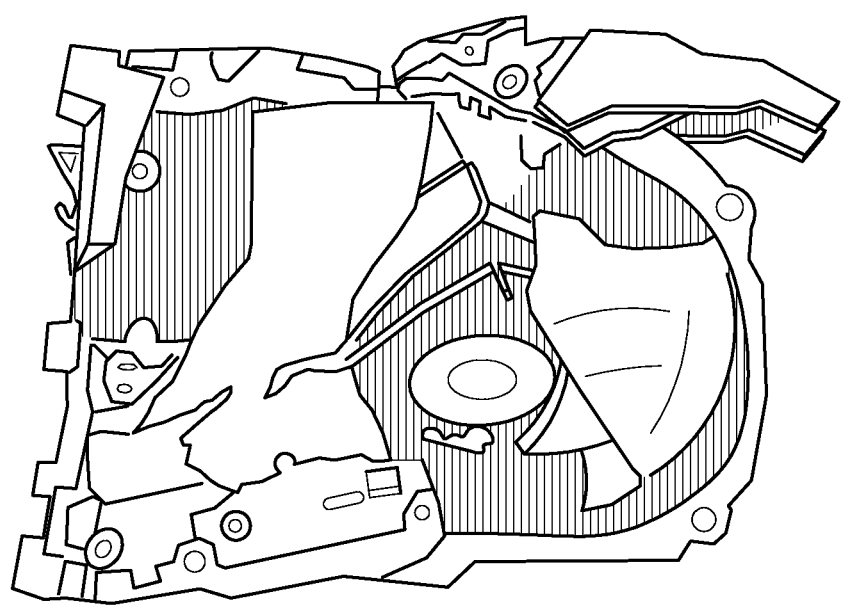
FIG. 2a shows a roughly shredded computer hard drive prior to being processed by the method of the present invention.

In use, scrap assemblies containing rare earth magnets are comminuted by a shredder (not shown) and manually transferred into the porous container 14. In other embodiments (not shown), the shredded assemblies 46 are passed along a conveyor to the porous container 14. The shredded assemblies 46 comprise shredded computer hard drives and voice coil assemblies, like the ones shown in FIGS. 2a and 2b. The lid 20 of the reaction vessel 12 is closed and secured by the securing means 22 so that the reaction vessel 12 is gas tight. The reaction vessel 12 is then evacuated through the tubing 30 (through open valve 32) using the rotary vacuum pump 28 to a pressure of $10^{-2}$ mbar, as indicated by the pressure transducer 42. The valve 32 is closed and the reaction vessel 12 is backfilled with argon from gas supply source 33 to a pressure of 1 mbar, through gas control system 36 and open valve 40 in gas line 36. The gas line valve 40 is then closed and the valve 32 is opened to allow the vacuum pump 28 to evacuate the reaction vessel 12 to a pressure of $10^{-2}$ mbar. Valve 32 is then closed and the reaction vessel 12 is backfilled with hydrogen from supply source 34 to a pressure of between 1 and 7 bars. The pressure in the reaction vessel is maintained by the gas control system 36.

The decrepitation process starts once the hydrogen enters the reaction vessel 12 and accesses the assemblies 46, turning the rare earth magnets into a particulate material 48. The assemblies are exposed to the hydrogen gas for 4 to 5 hours.

The porous container 14 is agitated by a vibration means (not shown) during or after the decrepitation process to move the decrepitated magnet particles from the scrap assembly material and through the holes of the porous container 14 so that they collect in the bottom of the reaction vessel 12. Valve 26 is opened to allow the particles to fall from the reaction vessel 12 into the collection vessel 24.

If degassing of the particles is required, the valve 26 is left closed and vibration is not applied. The decrepitated scrap assembly material (including the rare earth particulate material) is heated by the heater 16 to a temperature of 750° C., which is monitored using thermocouples 44 and controlled using a temperature controller (not shown). Degassing is carried out at a pressure of below 1 Bar, ideally under a vacuum of $10^{-2}$ Bar The hydrogen removed from the rare earth particulate material can either be pumped into the atmosphere or it can be captured by a metal hydride store 50.

The processing vessel can decrepitate a scrap charge of approximately 300 to 400 shredded hard disk drives or 1000 to 2000 voice coil assemblies. Processing 400 shredded hard drives results in the recovery of approximately 8 kg of NdFeB particulate material. Processing of 2000 voice coil assemblies results in the recovery of approximately 40 kg of NdFeB particulate material.

Figure 3:
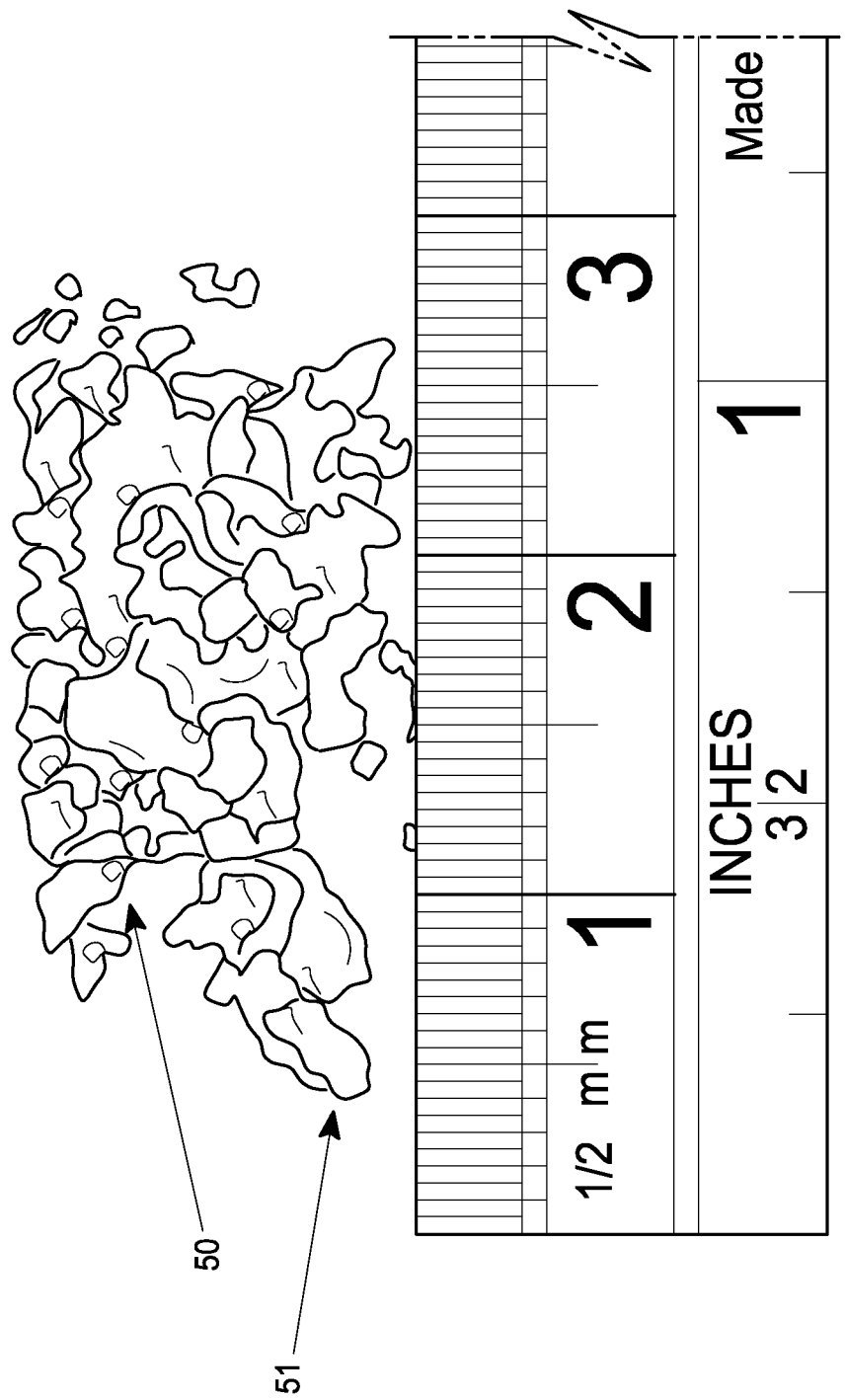
FIG. 3 shows rare earth particulate material obtained by the method of the present invention.

FIG. 3 shows a sample of rare earth particulate material produced by the method of the present invention. The sample contains particles 50 with areas of nickel plating 51 present.

Rare earth particulate material recovered from assemblies by the methods of the invention may be further processed, for example by jet milling, and used in a variety of applications. For example, the material is suitable for use in the following processes:

1. The recycled particles can be put into a refining process, such as fused salt electrolysis, to separate the rare earths from the other components such as iron and boron.
2. The particles can be jet milled (optional), pressed and then sintered into new magnets.
3. The particles can be re-melted and melt spun to produce material for bonded magnets.
4. The particles may be heated in hydrogen and then degassed to produce fine grained material for bonded magnets by mixing with an appropriate bonding agent.
5. Degassed particles may be directly mixed with a bonding agent such as epoxy and then pressed to make cheap bonded magnets.

If the magnets of the assemblies have a relatively low rare earth content to start with (e.g. near stoichiometric $Nd_2Fe_{14}B$), it may be necessary to add extra rare earth to the decrepitated particulate material prior to forming new magnets in order to compensate for rare earth 'lost' to oxidation. During recycling the oxygen content of the rare earth material tends to rise and rare earth oxides form. A certain amount of clean, metallic rare earth rich phase is essential for sintering to full density, giving better magnetic properties and corrosion resistance. The increased oxygen content can make the material more difficult to sinter into new magnets and give a lower density product, hence the addition of small amounts of Nd or $NdH_2$ to the particulate material. Typically an addition of 1-2 at % has been shown to give the best magnetic properties. If the Nd content of the magnets is sufficiently high to begin with then extra Nd may not be required as a smaller overall percentage of the neodymium will oxidise during processing.

Table 1 shows the properties of recycled magnets made from rare earth particulate material produced by the process of the invention, compared to an intact rare earth NdFeB magnet 'as received', i.e. prior to decrepitation. The 'as received' magnet had a composition of $Nd_{13.4}Dy_{0.8}Al_{0.7}Nb_{0.3}Fe_{78.5}B_{6.3}$ (at % from ICP). Recycled sintered magnets were made using decrepitated particulate material with no Nd addition and with additions of 1%, 2% and 4% Nd.

TABLE 1

|  | Density (gcm$^{-3}$) | % porosity | Br (mT) | Hcj (kAm$^{-1}$) | Bhmax (kJm$^{-3}$) |
|---|---|---|---|---|---|
| Intact magnet | 7.58 | 0 | 1380 | 860 | 340 |
| No Nd addition | 6.8 | 10.3 | 1080 | 460 | 195 |
| 1 at % Nd | 7.29 | 3.8 | 1060 | 890 | 200 |
| 2 at % Nd | 7.48 | 1.3 | 1160 | 925 | 250 |
| 4 at % Nd | 7.49 | 1.2 | 930 | 1025 | 155 |

It was observed that the recycled magnet made with an addition of 2% Nd had the best properties including highest coercivity (Hcj) and highest remanence (Br).

What is claimed is:

1. Apparatus for producing and separating rare earth particulate material from an assembly comprising a rare earth magnet using hydrogen decrepitation, the apparatus comprising:
    a reaction vessel having an opening which is capable of being closed to form a gas-tight seal;
    a separator configured to separate the rare earth particulate material from the assembly; and
    a collector configured to collect the rare earth particulate material;
    wherein the reaction vessel is connected to a vacuum pump and a gas control system;
    wherein the gas control system controls the supply of hydrogen gas to the reaction vessel; and
    wherein the separator comprises:
        a porous container located within the reaction vessel and having holes of appropriate size to allow the rare earth particulate material to pass through and to retain the assembly within the container; and
        a device capable of tumbling the assembly contained within the porous container to facilitate separation of the rare earth particulate material from the assembly and movement of the rare earth particulate material though the holes of the porous container.

2. The apparatus according to claim 1, further comprising a device configured to open or destructively process the assembly prior to the hydrogen decrepitation.

3. The apparatus according to claim 2, wherein the device comprises a shredder.

4. The apparatus according to claim 2, further comprising a conveyor for transporting the assembly from the device to the reaction vessel.

5. The apparatus according to claim 1, further comprising a heater for heating the reaction vessel during the hydrogen decrepitation.

6. The apparatus according to claim 1, wherein the porous container is removable from the reaction vessel.

7. The apparatus according to claim 1, wherein the collector is isolated from the reaction vessel by a valve which is capable of being opened to allow the rare earth particulate material to pass from the reaction vessel into the collector.

8. The apparatus according to claim 7, wherein the collector is situated underneath the reaction vessel so that the rare earth particulate material falls under gravity into the collector when the valve is opened.

9. The apparatus according to claim 1, wherein the collector is separate from, and connected to, the reaction vessel.

10. A method for using the apparatus of claim 1 to produce and separate rare earth particulate material from the assembly, the method comprising the steps of:
    providing the assembly within the reaction vessel,
    using the gas control system, controlling the supply of hydrogen gas to the reaction vessel to expose the assembly to the hydrogen gas to effect hydrogen decrepitation of the rare earth magnet whereby the rare earth particulate material is produced,
    using the separator, separating the rare earth particulate material from the rest of the assembly,
    using the collector, collecting the rate earth particulate material and wherein the separating comprises tumbling the assembly.

11. The method according to claim 10, wherein the rare earth magnet is NdFeB or SmCo.

12. The method according to claim 10, wherein the magnet is demagnetised during the hydrogen decrepitation.

13. The method according to claim 12, wherein the magnet is demagnetised by heating or by reversing a magnetic field.

14. The method according to claim 10, further comprising an initial step of opening the assembly prior to exposing the assembly to the hydrogen gas, in order to facilitate exposure of the rare earth magnet to the hydrogen.

15. The method according to claim 14, wherein the initial step of opening of the assembly involves destructively processing the assembly.

16. The method according to claim 10, wherein the assembly is exposed to a mixture of hydrogen with one or more inert gases.

17. The method according to claim 10, wherein the assembly is exposed to an atmosphere comprising no more than 10% hydrogen.

18. The method according to claim 10, wherein the pressure of hydrogen gas is from 0.5 bar to 20 bar.

19. The method according to claim 10, wherein the hydrogen decrepitation is carried out at a temperature of no more than 600° C.

20. The method according to claim 10, wherein the hydrogen decrepitation is carried out at a temperature of no more than 200° C.

21. The method according to claim 10, further comprising the step of separating the rare earth particulate material resulting from the hydrogen decrepitation from the remaining assembly components.

22. The method according to claim 10, further comprising the step of degassing to remove hydrogen from the rare earth particulate material.

23. The method of claim 22, wherein degassing is carried out by heating the particulate material.

24. The method of claim 23, wherein degassing is carried out at a temperature of no more than 800° C.

25. Apparatus for producing and separating rare earth particulate material from an assembly comprising a rare earth magnet using hydrogen decrepitation, the apparatus comprising
    a reaction vessel having an opening which is capable of being closed to form a gas-tight seal,
    a separator configured to separate the rare earth particulate material from the assembly,
    a collector constituted by the reaction vessel or a part thereof and configured to collect the rare earth particulate material,
    wherein the reaction vessel is connected to a vacuum pump and a gas control system, and
    wherein the gas control system controls the supply of hydrogen gas to the reaction vessel, and wherein the separator comprises:
        a porous container located within the reaction vessel and having holes of appropriate size to allow the rare earth particulate material to pass through and to retain the assembly within the container; and a device capable of tumbling the assembly contained within the porous container to facilitate separation of the rare earth particulate material from the assembly and movement of the rare earth particulate material though the holes of the porous container.

\* \* \* \* \*